US008381203B1

(12) United States Patent
Beylin et al.

(10) Patent No.: US 8,381,203 B1
(45) Date of Patent: Feb. 19, 2013

(54) INSERTION OF MULTITHREADED EXECUTION SYNCHRONIZATION POINTS IN A SOFTWARE PROGRAM

(75) Inventors: Boris Beylin, Palo Alto, CA (US); Robert Steven Glanville, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1806 days.

(21) Appl. No.: 11/556,581

(22) Filed: Nov. 3, 2006

(51) Int. Cl.
*G06F 9/45* (2006.01)
(52) U.S. Cl. ......... 717/150; 717/149; 717/156; 718/100
(58) Field of Classification Search .................. None
See application file for complete search history.

(56) References Cited

U.S. PATENT DOCUMENTS

| | | | | |
|---|---|---|---|---|
| 6,349,322 | B1* | 2/2002 | Shaylor ......................... | 718/107 |
| 7,353,369 | B1* | 4/2008 | Coon et al. ................... | 712/234 |
| 7,512,950 | B1* | 3/2009 | Marejka ........................ | 718/106 |
| 7,543,136 | B1* | 6/2009 | Coon et al. ................... | 712/228 |
| 7,571,301 | B2* | 8/2009 | Kejariwal et al. ............. | 712/215 |
| 2003/0079203 | A1* | 4/2003 | Sokolov ........................ | 717/118 |
| 2004/0083459 | A1* | 4/2004 | Roediger et al. ............. | 717/130 |
| 2004/0250240 | A1* | 12/2004 | Stoodley et al. ............. | 717/116 |
| 2005/0081185 | A1* | 4/2005 | Stoodley et al. ............. | 717/100 |

OTHER PUBLICATIONS

John Nguyen, "Compiler Analysis to Implement Point-to-Point Synchronization in Parallel Programs", Aug. 1993, Ph.D. Thesis at Massachusetts Institute of Technology.*
W.E. Cohen et al. "Dynamic Barrier Architecture for Multi-Mode Fine-Grain Parallelism Using Conventional Processors", Mar. 1994, Purdue University School of Electrical Engineering Technical Report.*
Chau-Wen Tseng "Compiler Optimizations for Eliminating Barrier Synchronization", 1995, Proceedings of the fifth ACM SIGPLAN Symposium on Principles and Practice of Parallel Programming.*

* cited by examiner

*Primary Examiner* — Chat Do
*Assistant Examiner* — Jue Wang
(74) *Attorney, Agent, or Firm* — Patterson & Sheridan, LLP

(57) ABSTRACT

A compiler is configured to determine a set of points in a flow graph for a software program where multithreaded execution synchronization points are inserted to synchronize divergent threads for SIMD processing. MIMD execution of divergent threads is allowed and execution of the divergent threads proceeds until a synchronization point is reached. When all of the threads reach the synchronization point, synchronous execution resumes. The synchronization points are needed to ensure proper execution of the certain instructions that require synchronous execution as defined in some graphics APIs and when synchronous execution improves performance based on a SIMD architecture.

10 Claims, 12 Drawing Sheets

INSERTION OF MULTITHREADED EXECUTION SYNCHRONIZATION POINTS IN A SOFTWARE PROGRAM

BACKGROUND OF THE INVENTION

1. Field of the Invention

The present invention generally relates to graphics processing and more specifically to a system and method for synchronizing divergent threads in a single-instruction, multiple-data ("SIMD") architecture.

2. Description of the Related Art

Current graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process in parallel as much graphics data as possible throughout the different parts of the graphics pipeline. Graphics processors with SIMD architectures are designed to maximize the amount of parallel processing in the graphics pipeline. In a SIMD architecture, the various threads attempt to execute program instructions synchronously as often as possible to increase processing efficiency.

A problem typically arises, however, when the program includes branches, and some threads want to execute the branch, but others do not. The threads diverge and are processed in a multiple-instruction, multiple-data ("MIMD") manner, i.e., without synchronous execution. Certain instructions defined in some graphics applications programming interfaces (APIs) require synchronous execution and therefore, limit the programming flexibility since divergence is not permitted. Furthermore, it is desirable to resume synchronous execution of the threads when the threads can converge following execution of the branch, in order to benefit from SIMD processing efficiencies.

Accordingly, what is needed in the art is a mechanism for inserting multithreaded execution synchronization points in software programs to synchronize divergent threads for SIMD processing while permitting MIMD execution for divergent threads.

SUMMARY OF THE INVENTION

A compiler is configured to determine a minimum set of points in a control flow graph for a software program where multithreaded execution synchronization points are inserted to synchronize divergent threads for processing in a SIMD architecture. MIMD execution of divergent threads is allowed, and execution of the divergent threads proceeds until a synchronization point is reached. When all of the threads reach the synchronization point, synchronous execution resumes. Although it is desirable to gain performance benefits from synchronous processing, a minimum number of synchronization points are used to minimize the number of clock cycles divergent threads spend waiting for other divergent threads to reach each synchronization point. The minimum number of synchronization points is needed to ensure proper execution of certain instructions that require synchronous execution as defined in some graphics APIs and when synchronous execution improves performance based on a particular SIMD architecture.

Various embodiments of a method of the invention for inserting synchronization points in a software program include identifying a first node of a control flow graph that represents the software program, inserting a push synchronization instruction into a dominate node that is post-dominated by the first node, to push a synchronization token onto a stack during execution of the software program, and inserting a pop synchronization instruction into the first node that causes the synchronization token to be popped from the stack during execution of the software program when all execution threads in a thread group are synchronized.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 4:
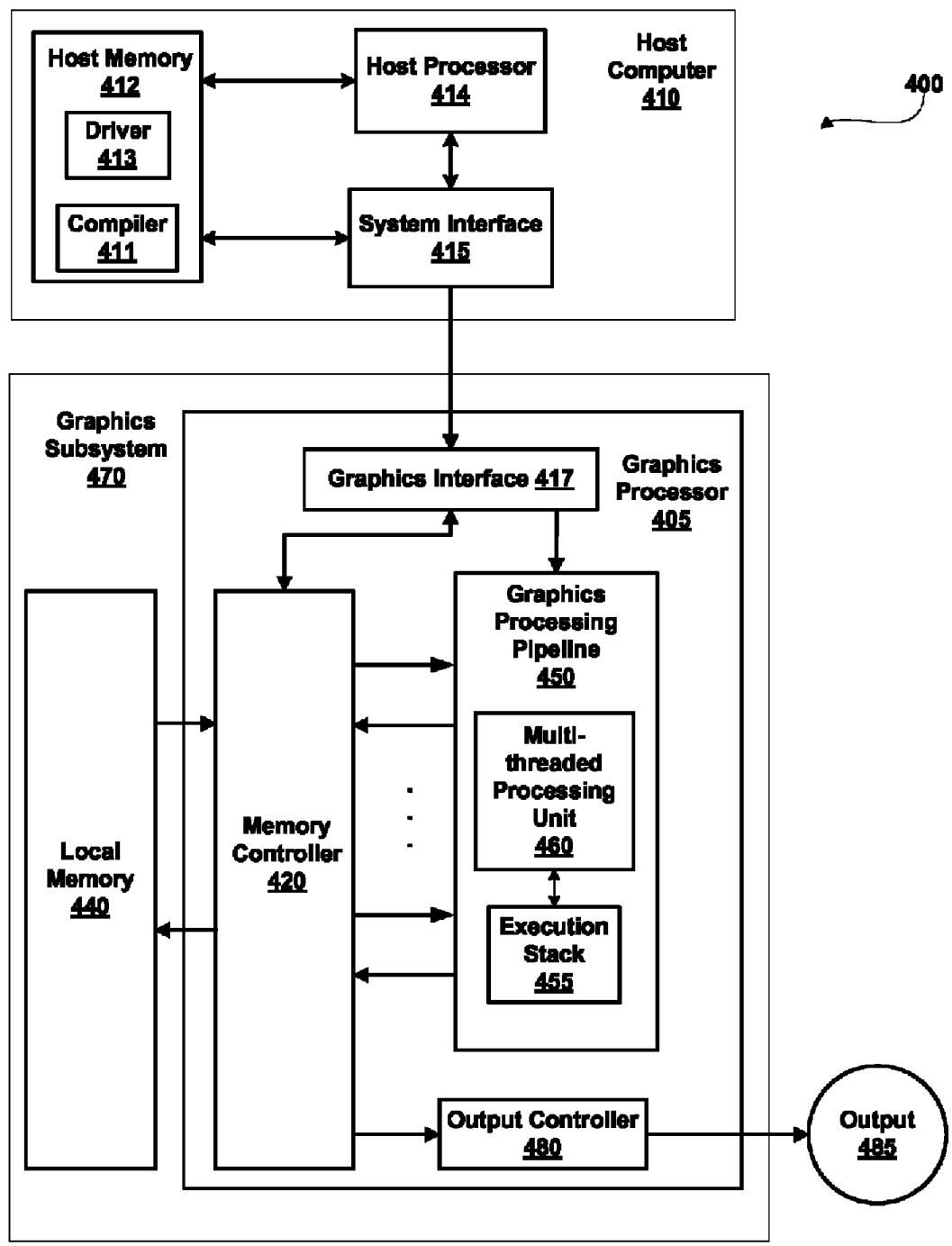
FIG. 4 is a block diagram illustrating a computing system and a compiler configured to insert synchronization points into a computer program in accordance with one or more aspects of the present invention.
Figure 5:
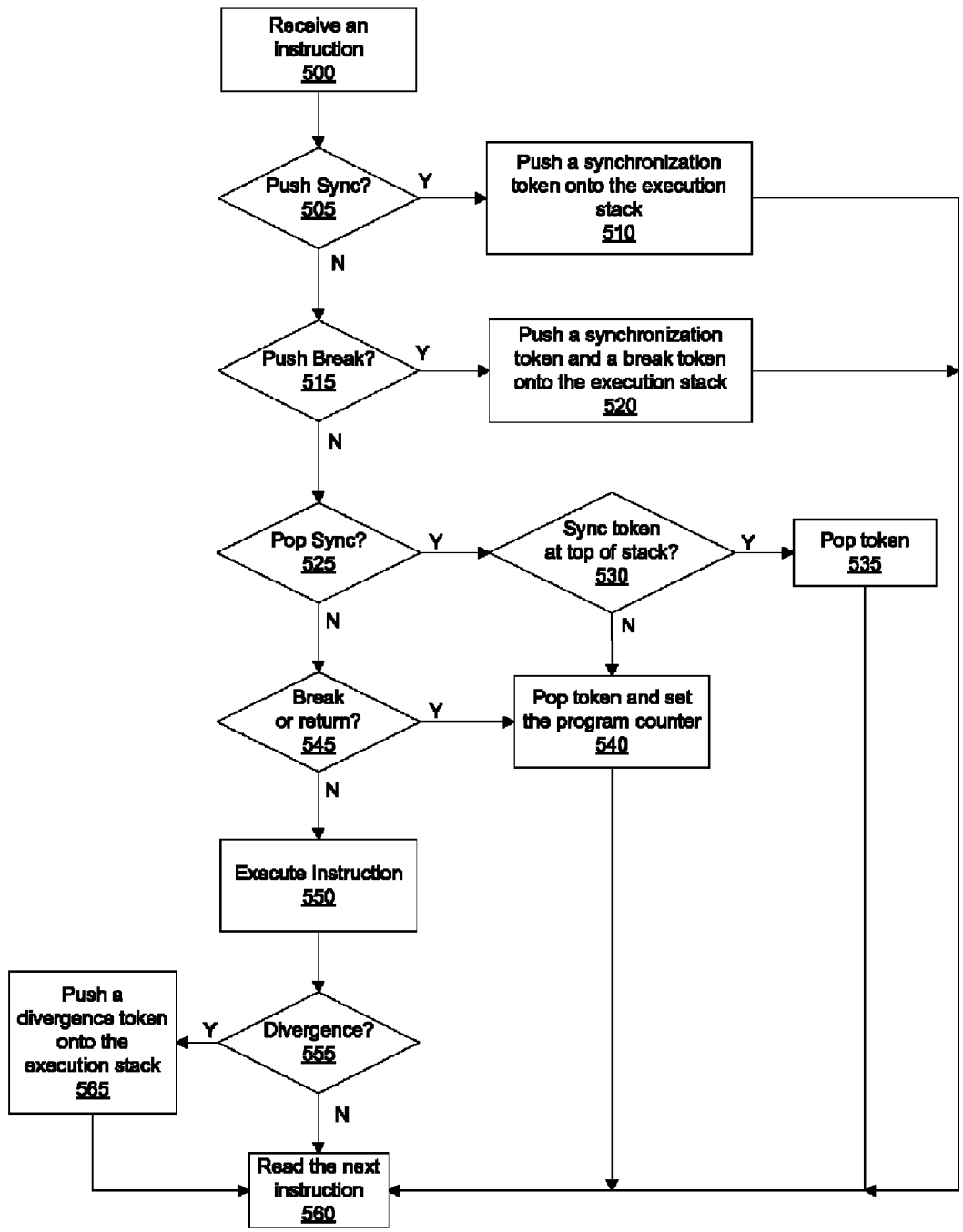
FIG. 5 is a flow diagram of method steps for executing the push synchronization and pop synchronization instructions in accordance with one or more aspects of the present invention.

In a SIMD architecture, a processing thread is assigned to each sample to execute a program. When operating in a synchronized mode, each thread in a particular multithreaded processing unit independently and simultaneously executes the same operations (or instructions) on its respective sample. This type of synchronized processing is advantageous because, among other things, it allows groups of like samples to be processed simultaneously, which increases graphics processing efficiency. However, there are points in a program (i.e., branches) where threads in a thread group are allowed to "diverge" from one another and be processed in a MIMD manner, so that one or more threads may execute instructions on their respective samples that do not need to be executed by the other threads in the thread group. FIGS. 4 and 5 describe a system and method that may be implemented to manage thread divergences that may occur when a thread group encounters one or more branches in a program.

In order to maintain processing efficiencies and compatibility with graphics APIs, at certain times during execution of a program, divergent threads need to be synchronized and processed in a SIMD manner. A conventional control flow graph may be used to represent all paths that might be traversed during the execution of the program. The control flow graph includes nodes that are connected by edges. The nodes, also referred to as code blocks, each represent a portion of the program that does not include any branches or jumps, i.e., the portion is a straight-line sequence of program instructions. Edges between the nodes or code blocks represent jumps in the program.

A compiler is configured to determine a minimum set of points in the control flow graph where multithreaded execution synchronization points are inserted to synchronize any divergent threads for SIMD processing. The compiler enforces synchronization only on varying conditional branches where a split of control flow in the program may result in different threads taking different paths. When the compiler can determine that all of the threads will follow the same path, a synchronization point is not needed. Use of arbitrary branches in the program may result in portions of the program that cannot by synchronized.

Following synchronization, the threads may diverge from each other until another synchronization point is reached. An execution stack is used to store the state information needed to process the divergent threads in a SIMD architecture that simulates a MIMD architecture by allowing individual threads in a thread group to diverge. Although it is desirable to gain performance benefits from synchronous processing, a minimum number of synchronization points are used to minimize the number of clock cycles divergent threads spend waiting for other divergent threads to reach each synchronization point.

Figure 1A:
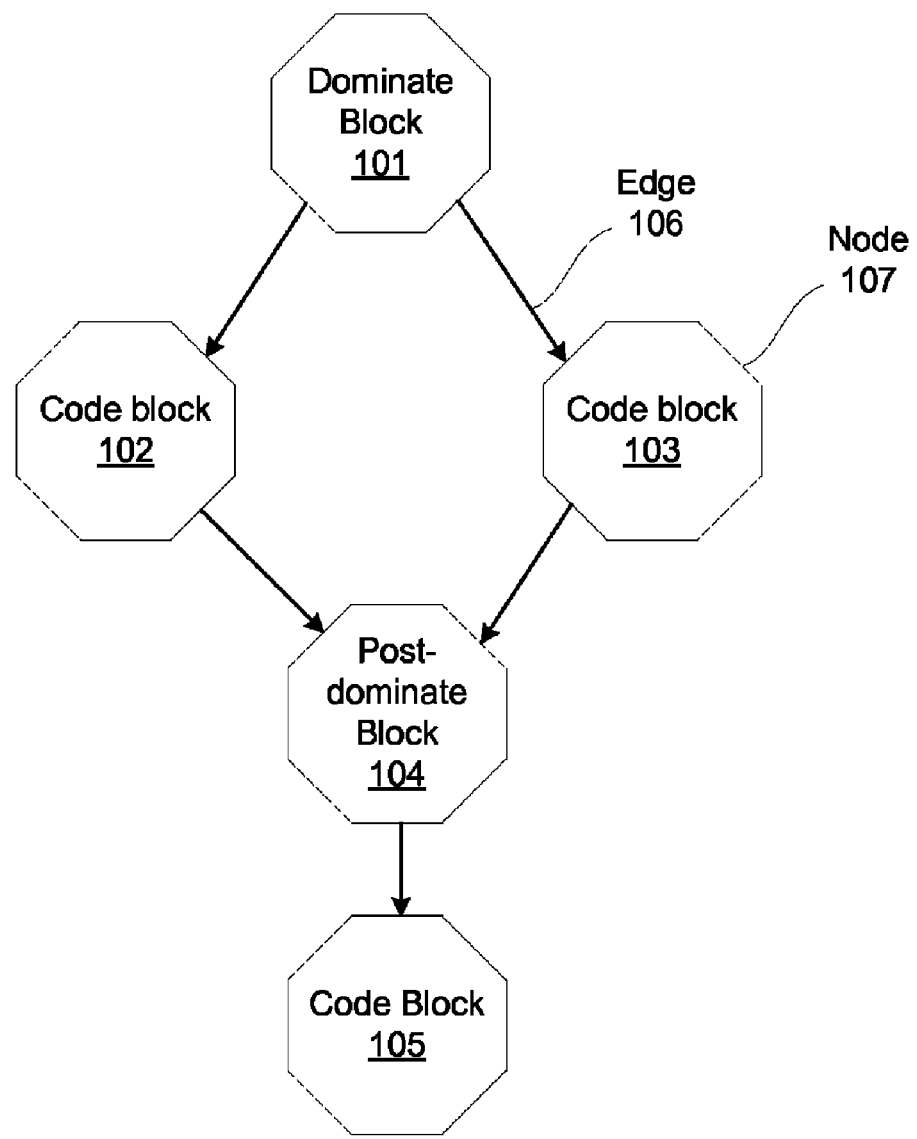
FIG. 1A is a control flow graph of an if-then-else portion of a software program in accordance with one or more aspects of the present invention.

FIG. 1A is a control flow graph of an if-then-else portion of a software program, in accordance with one or more aspects of the present invention. The control flow graph includes several nodes, such as code block 103 that is a node 107. Edges, such as edge 106 represent jumps in the control flow. For example, edge 106 represents a jump from a dominate block 101 to code block 103. Each code block may include one or more program instructions. An edge is a result of a branch instruction, such as a call, break, jump, conditional branch, or the like. A conditional branch instruction produces two edges out of a code block, such as dominate block 101.

To insert a synchronization point into an acyclic branch, the compiler inserts two synchronization instructions into the program. A push synchronization instruction is inserted into dominate block 101 in order to push a synchronization token onto the execution stack just before the conditional branch included in dominate block 101 is executed. A complimentary synchronization instruction, a pop synchronization instruction is inserted into an immediate post-dominate block 104. The pop synchronization instruction is used to pop the synchronization token from the stack after all of the threads in the thread group have reached post-dominate block 104.

Dominate block 101 includes the conditional branch instruction where code block 102 and code block 103 are the "if then" and "else" clauses. A similar control flow graph that omits either code block 102 or 103 may be used to represent an "if then" clause without an "else" clause. Dominate block 101 dominates code block 102, code block 103, and post-dominate block 104 since every path from the entry that reaches post-dominate block 104 has to pass through dominate block 101. Post-dominate block 104 post-dominates dominate block 101 since every path from dominate block 101 has to pass through post-dominate block 104. A code block 105 post-dominates dominate block 101, code block 102, code block 103, and post-dominate block 104. As a general rule, every push synchronization instruction must be accompanied by a pop synchronization instruction, and the block that the push synchronization instruction is inserted into must dominate the block that the pop synchronization instruction is inserted into. Likewise, the block that the pop synchronization instruction is inserted into must post-dominate the block that the push synchronization instruction is inserted into in order to synchronize all of the threads. When a pop synchronization instruction is inserted into a block that does not post-dominate the block that the push synchronization instruction was inserted into, then only a portion of the threads may be synchronized and the synchronization point is a "partial" synchronization point.

Figure 1B:
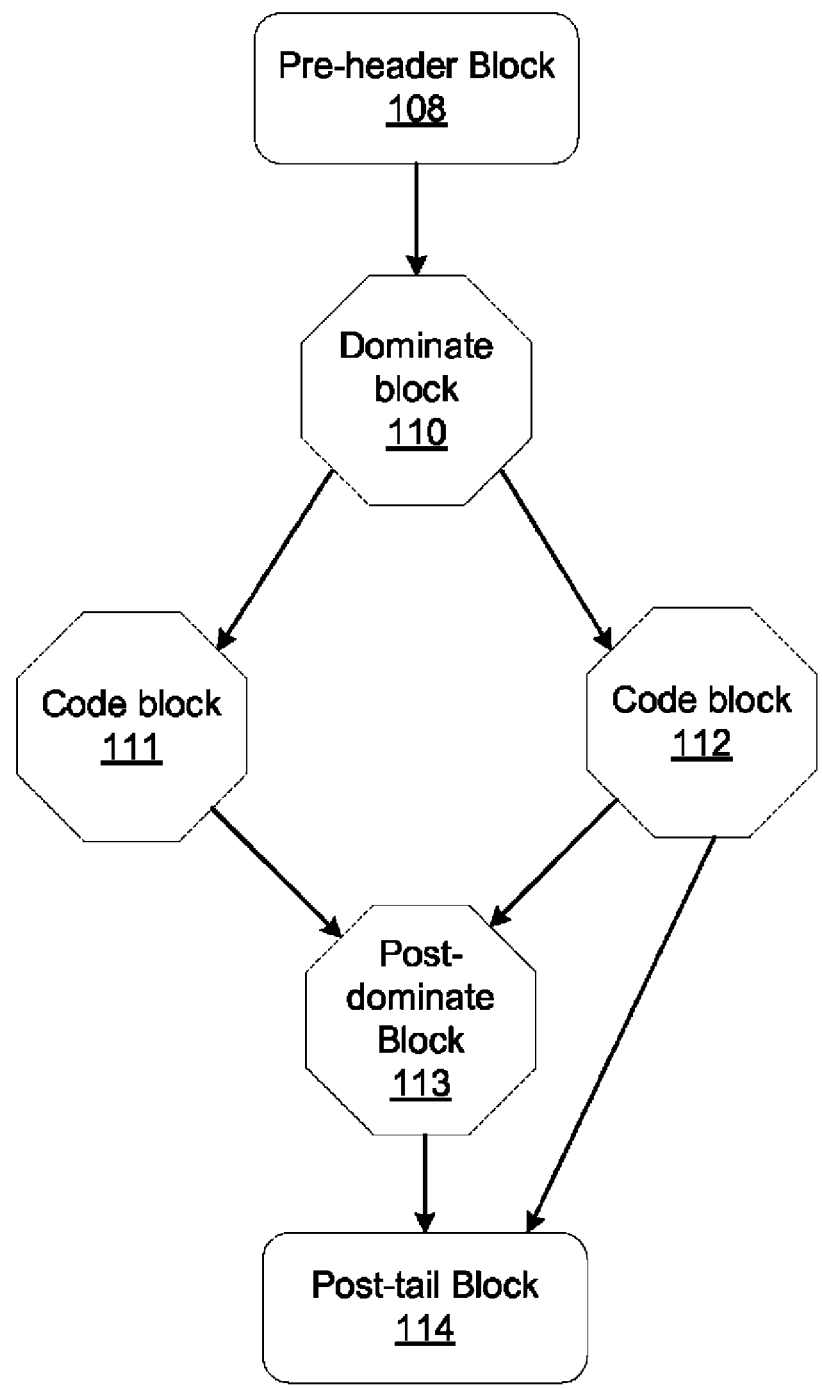
FIG. 1B is a control flow graph of an if-then-else portion of a software program with a return in accordance with one or more aspects of the present invention.

FIG. 1B is a control flow graph of an if-then-else portion of a software program with a return, in accordance with one or more aspects of the present invention. In addition to a conditional branch, the control flow graph shown in FIG. 1B includes a return edge from code block 112 to a post-tail block 114. A compiler may insert a push synchronization instruction into a dominate block 110 and a pop synchronization instruction in to a post-dominate block 113 to add a first synchronization point. However, a thread may take a path from code block 112 to post-tail block 114 without passing through post-dominate block 113, and will not be synchronized with the other threads waiting at post-dominate block 113. Therefore, another mechanism is used to synchronize "run away" threads when a partial synchronization point does not synchronize the run away threads.

If a pre-header block 108 and/or post-tail block 114 do not exist in the control flow graph those blocks are created by the compiler when a push break instruction and a complimentary pop break instruction are inserted into the program and branch instructions are changed to break instructions to create a second synchronization point. Specifically, a push break instruction is inserted into pre-header block 108 that includes the address of the inserted break instruction, e.g., the address of post-tail block 114. The address of post-tail block 114 is pushed onto the execution stack when the push break instruction is executed. Execution of the push break instruction also causes a synchronization token to be pushed onto the execution stack. A pop synchronization instruction is inserted into post-tail block 114 to pair with the implicit push synchronization instruction included with the push break instruction.

The portion of the branch instruction in code block 112 corresponding to the edge from code block 112 to post-tail block 114 is changed to a break instruction. Likewise, the branch instruction in post-dominate block 113 corresponding to the edge from post-dominate block 113 to post-tail block 114 is changed to a break instruction. Generally, every branch coming into post-tail block 114 is replaced with a break instruction. When the break instructions are executed the address of post-tail block 114 is popped from the execution stack. The threads are then synchronized when they have all reached post-tail block 114 (the second synchronization point) and the pop synchronization instruction is executed to complete the synchronization of any run away threads.

Acyclic branches may be recognized by the compiler as potentially divergent or uniform (non-divergent) based on the branch condition, loop exits and continues may vary even if the loop iteration test is not varying. When the compiler identifies varying loop exits or continues, the compiler treats the entire loop as a varying control flow region. The compiler inserts a synchronization point outside of the loop by identifying a pre-header and post-tail block for each loop to be synchronized. A loop pre-header is a code block that is located outside of the loop body and is a unique predecessor of a loop header. A post-tail block is a code block that all control flow paths, other than returning exits, pass through after the loop. The pre-header must dominate the post-tail block and, if possible, the post-tail block should post-dominate the pre-header. Any run away thread paths may be handled as previously described in conjunction with FIG. 1B.

Figure 1C:
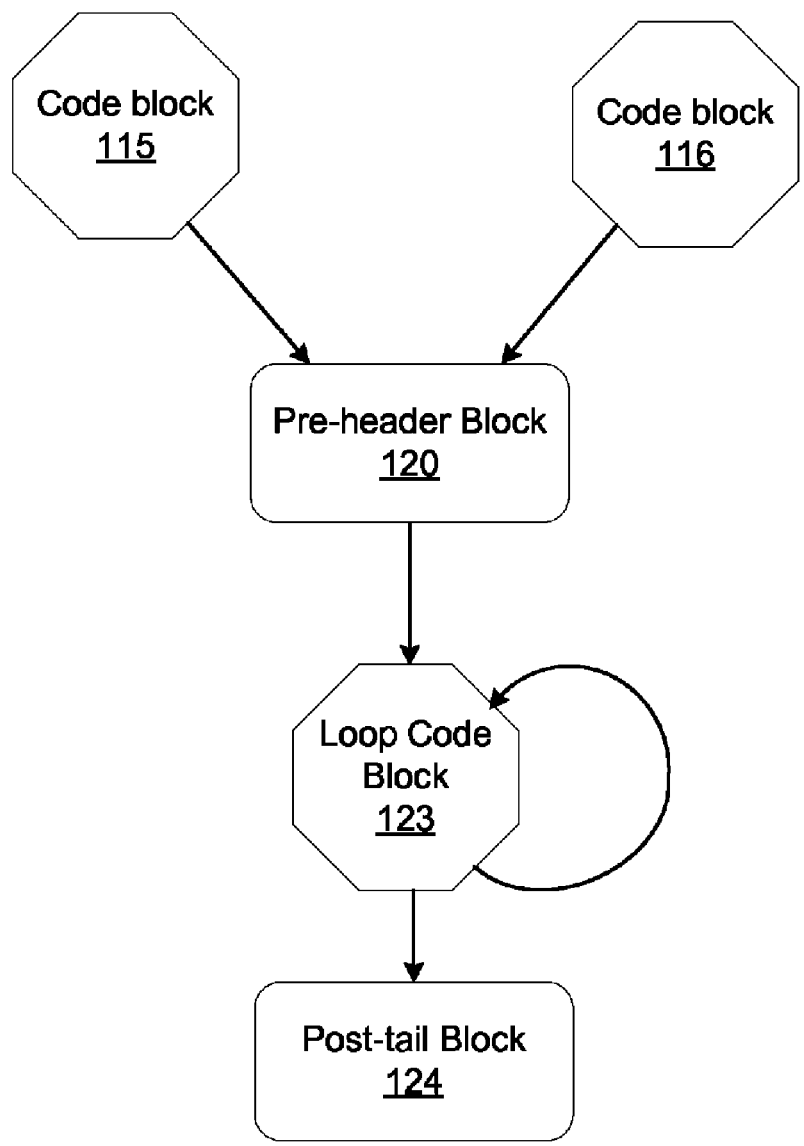
FIG. 1C is a control flow graph of loop portion of a software program in accordance with one or more aspects of the present invention.

FIG. 1C is a control flow graph of loop portion of a software program, in accordance with one or more aspects of the present invention. The compiler detects loops by detecting loop back branches. Whenever a branch is detected whose tail dominates its head, the compiler creates a loop record with basic clocks representing the loop head and loop tail. If a pre-header block does not exist, one may be created and predecessors of the loop head are then connected to the newly created pre-header block. For example, in FIG. 1C a loop code block 123 is the loop head and loop tail. The compiler creates pre-header block 120 and connects the predecessors of loop code block 123, code block 115 and code block 116, to pre-header block 120. The compiler inserts a synchronization point into post-tail block 124 of the program by adding a push synchronization instruction into pre-header block 120 and a corresponding pop synchronization instruction into post-tail block 124.

In order to identify a post-tail block, such as post-tail block 124 the compiler begins at the loop head in loop code block 123 and traverses the paths for each of the post-dominators until a node is located that is outside of the loop body. If such a node is found that is different from the exit block, then that node is the proper post-tail node for the loop, e.g., post-tail block 124. When the program uses only structured loop exits, all paths other than returning paths will merge at some node. An example of a loop with breaks and continues that requires synchronization is described in conjunction with FIGS. 3A, 3B, and 3C.

Figure 1D:
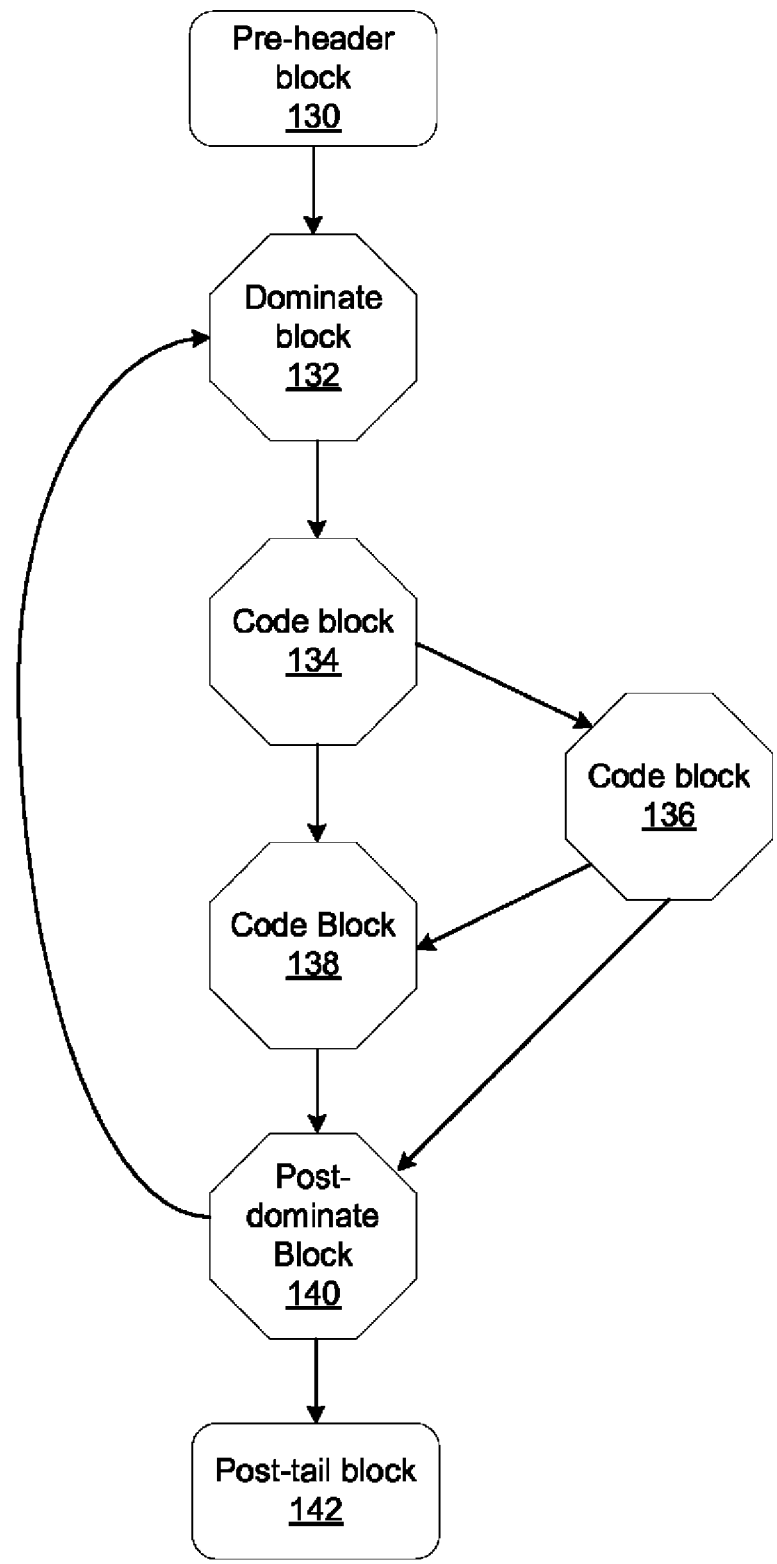
FIG. 1D is a control flow graph of loop with conditional branching portion of a software program in accordance with one or more aspects of the present invention.

FIG. 1D is a control flow graph of loop with conditional branching portion of a software program, in accordance with one or more aspects of the present invention. The conditional branch of code blocks 134, 136, and 138 may be synchronized by inserting a push synchronization instruction into code block 134 and inserting a corresponding pop synchronization instruction into code block 138. However, threads that take the path (continue edge) from code block 136 to post-dominate block 140 are run away threads that circumvent the synchronization point and must be synchronized using another synchronization point. The run away paths may be identified by computing control dependencies reaching each code block using conventional bit vector equations to identify run away paths caused by varying conditional branches.

The loop formed by the branch instruction in post-dominate block 140 that forms the edge from post-dominate block 140 to dominate block 132 may be synchronized by inserting synchronization points, inserting a push break instruction, and changing branch instructions into break instructions. Specifically, a push synchronization instruction and corresponding pop synchronization instruction is inserted into pre-header block 130 and post-tail block 142, respectively, to create a first synchronization point outside of the loop. A second synchronization point is created for the conditional branch of code block 124, as previously described. In order to synchronize the run away path from code block 136 to post-dominate block 140, a third synchronization point is created by inserting a push break instruction with the address of the loop tail, post-dominate block 140, into the loop header, dominate block 132. The branch instructions in code block 136 and code block 138 are changed to break instructions for the edges into post-dominate block 140.

Figure 1E:
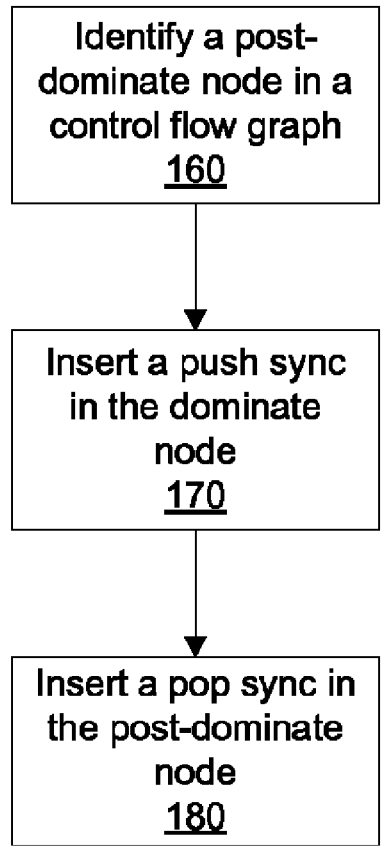
FIG. 1E is a flow diagram of method steps for inserting a synchronization point in a software program in accordance with one or more aspects of the present invention.

FIG. 1E is a flow diagram of method steps for inserting a synchronization point in a software program, in accordance with one or more aspects of the present invention. In step 160 the compiler identifies a post-dominate node in a control flow graph, such as post-dominate block 104, post-dominate block 113, post-tail block 124, and post-dominate block 140 of FIGS. 1A, 1B, 1C, and 1D, respectively. In step 170 the compiler inserts a push synchronization instruction into the dominate node that corresponds to the post-dominate node, such as dominate block 101, dominate block 110, pre-header block 120, and dominate block 132, of FIGS. 1A, 1B, 1C, and 1D, respectively. In step 180 the compiler inserts a pop synchronization instruction into the post-dominate node to create the synchronization point. This method may be used to synchronize all paths for branches and loops that do not include run away paths that bypass the synchronization point.

Figure 2A:
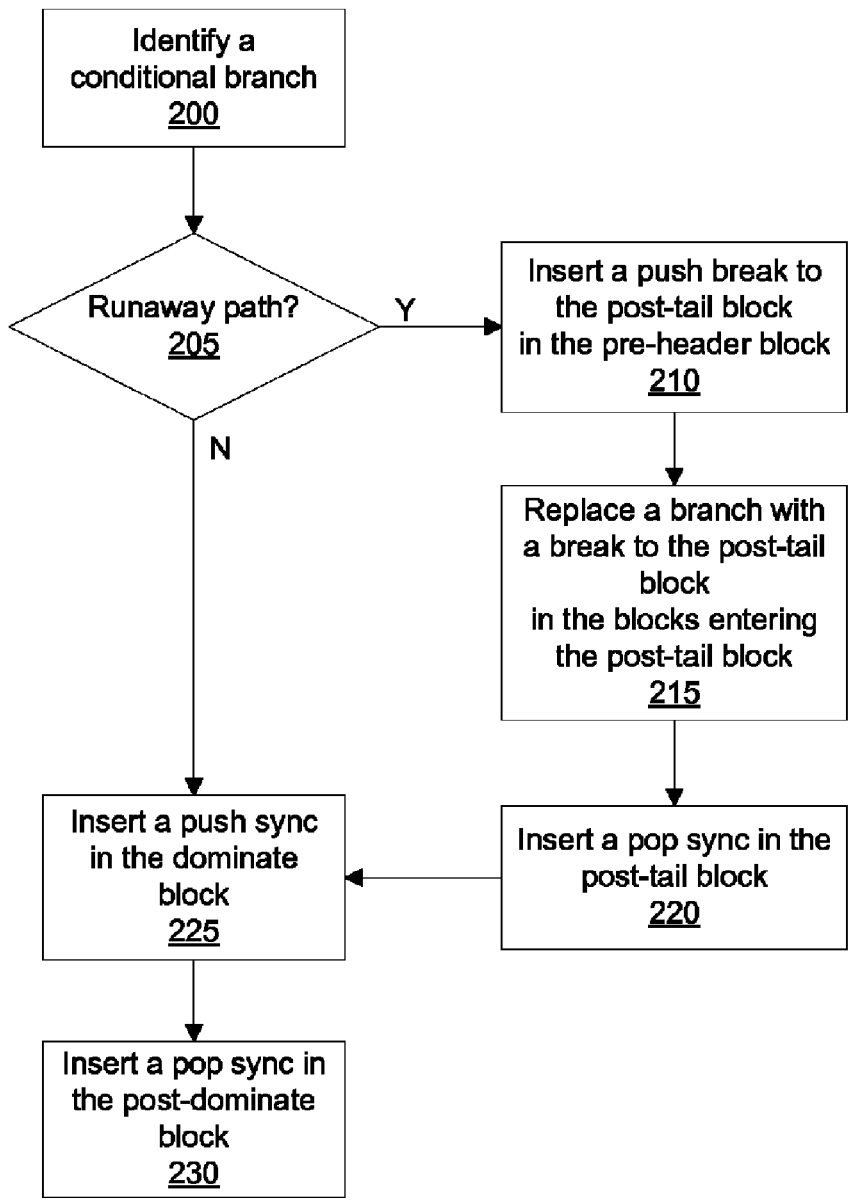
FIG. 2A is a flow diagram of method steps for inserting a synchronization point in an if-then-else portion of a software program in accordance with one or more aspects of the present invention.

FIG. 2A is a flow diagram of method steps for inserting a synchronization point in an if-then-else portion of a software program that may include run away paths, in accordance with one or more aspects of the present invention. In step 200 the compiler identifies a conditional branch instruction in a control flow graph, such as the control flow graphs shown in FIGS. 1A and 1B. In step 205 the compiler determines if the conditional branch instruction includes a run away path. If, in step 205 the compiler determines that the control flow graph of the portion of the program does not include a run away path, then the compiler proceeds directly to step 225. Otherwise, in step 210 the compiler inserts a push break instruction that includes the address of the post-tail block into the pre-header block.

The push break instruction also pushes a synchronization token onto the execution stack (before the push break token) since it includes an implicit push synchronization instruction. In step 215 the compiler replaces a branch instruction with a break instruction that includes the address of the post-tail block into blocks with paths that enter the post-tail block. In step 220 the compiler inserts a pop synchronization instruction into the post-tail block to create a synchronization point for threads taking the run away path.

In step 225 the compiler inserts a push synchronization instruction into the dominate block. In step 230 the compiler inserts a pop synchronization instruction into the post-dominate block to create a second synchronization point for the non-run away paths of the conditional branch.

Figure 2B:
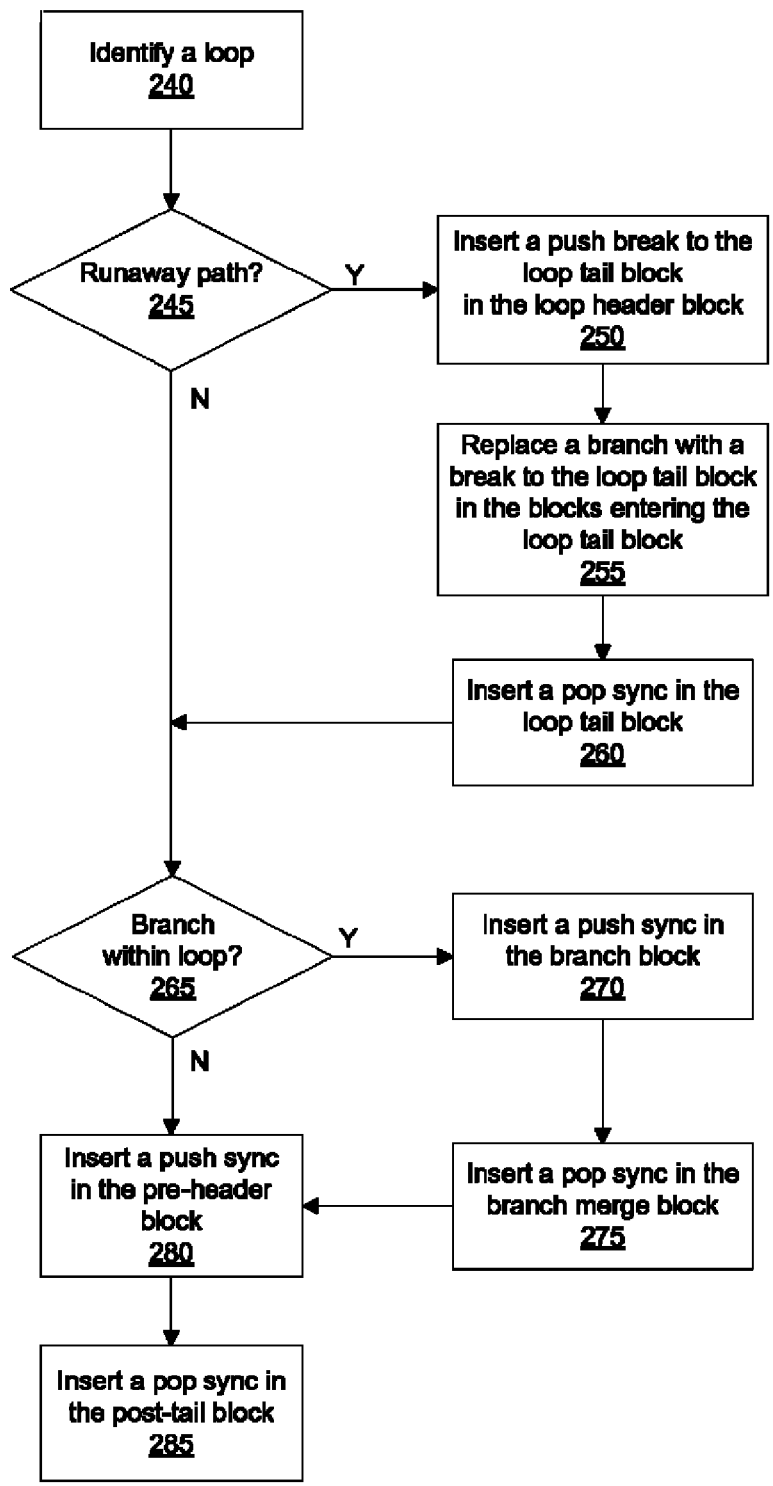
FIG. 2B is a flow diagram of method steps for inserting a synchronization point in a loop with conditional branching portion of a software program in accordance with one or more aspects of the present invention.

FIG. 2B is a flow diagram of method steps for inserting a synchronization point in a loop with conditional branching portion of a software program, in accordance with one or more aspects of the present invention. In step 240 the compiler identifies a loop in a control flow graph, such as the control flow graphs shown in FIGS. 1C and 1D. In step 245 the compiler determines if the loop includes a run away path. If, in step 245 the compiler determines that the control flow graph of the loop portion of the program does not include a run away path, then the compiler proceeds directly to step 265. Otherwise, in step 250 the compiler inserts a push break instruction that includes the address of the loop tail block into the loop header block. In step 255 the compiler replaces a branch instruction with a break instruction that includes the address of the loop tail block into blocks with paths that enter the loop tail block. In step 260 the compiler inserts a pop synchronization instruction into the loop tail block to create a synchronization point for threads taking the run away path.

In step 265 the compiler determines if a conditional branch is included within the loop, such as the code block 124 of FIG. 1D. Conditional branches with run away paths may be partially synchronized, i.e., threads can be synchronized for the non-run away paths. If, in step 260 the compiler determines that the loop does not include a conditional branch, then the compiler proceeds directly to step 280. Otherwise, in step 270 the compiler inserts a push synchronization instruction into the branch block. In step 275 the compiler inserts a pop synchronization instruction into the branch merge block, such as code block 138 of FIG. 1D, to create a (partial) synchronization point for the conditional branch. In step 280 the compiler inserts a push synchronization instruction into the pre-header block. In step 285 the compiler inserts a pop synchronization instruction into the post-tail block to create a synchronization point for the loop.

Figure 3A:
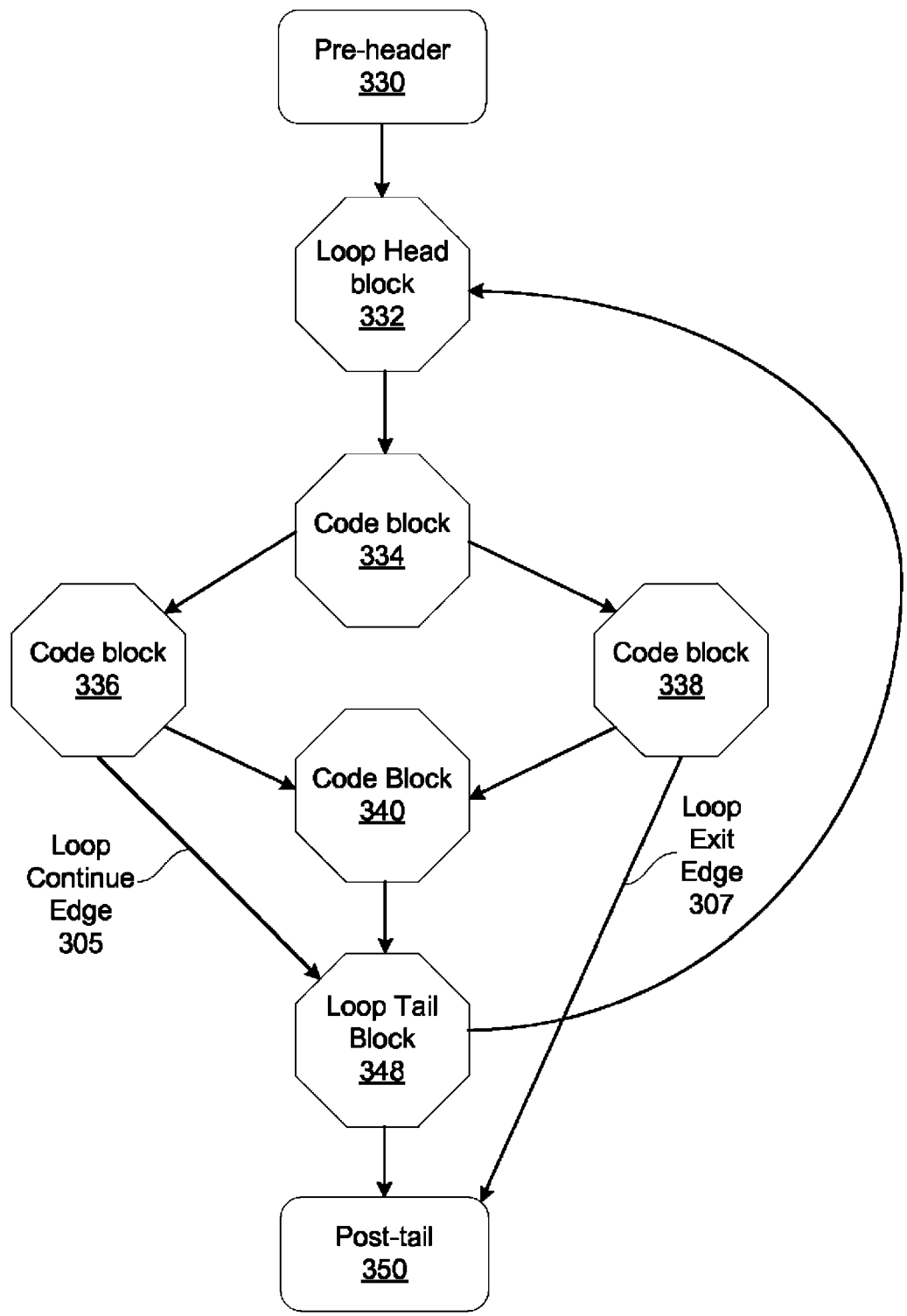
FIG. 3A is a control flow graph of loop with multiple exits portion of a software program in accordance with one or more aspects of the present invention.

FIG. 3A is a control flow graph of loop with multiple exits portion of a software program, in accordance with one or more aspects of the present invention. The control flow graph includes a loop continue edge 305 that is a run away path for the conditional branch in code-block 334. The control flow graph also includes a run away path, loop exit edge 307 that provides an additional exit from the loop. The first exit is the "fall-through" exit that is provided from loop tail block 348 to post-tail 350. The compiler inserts additional code blocks and edges in order to insert synchronization points into the program that will synchronize all of the threads, even the run away threads.

Figure 3B:
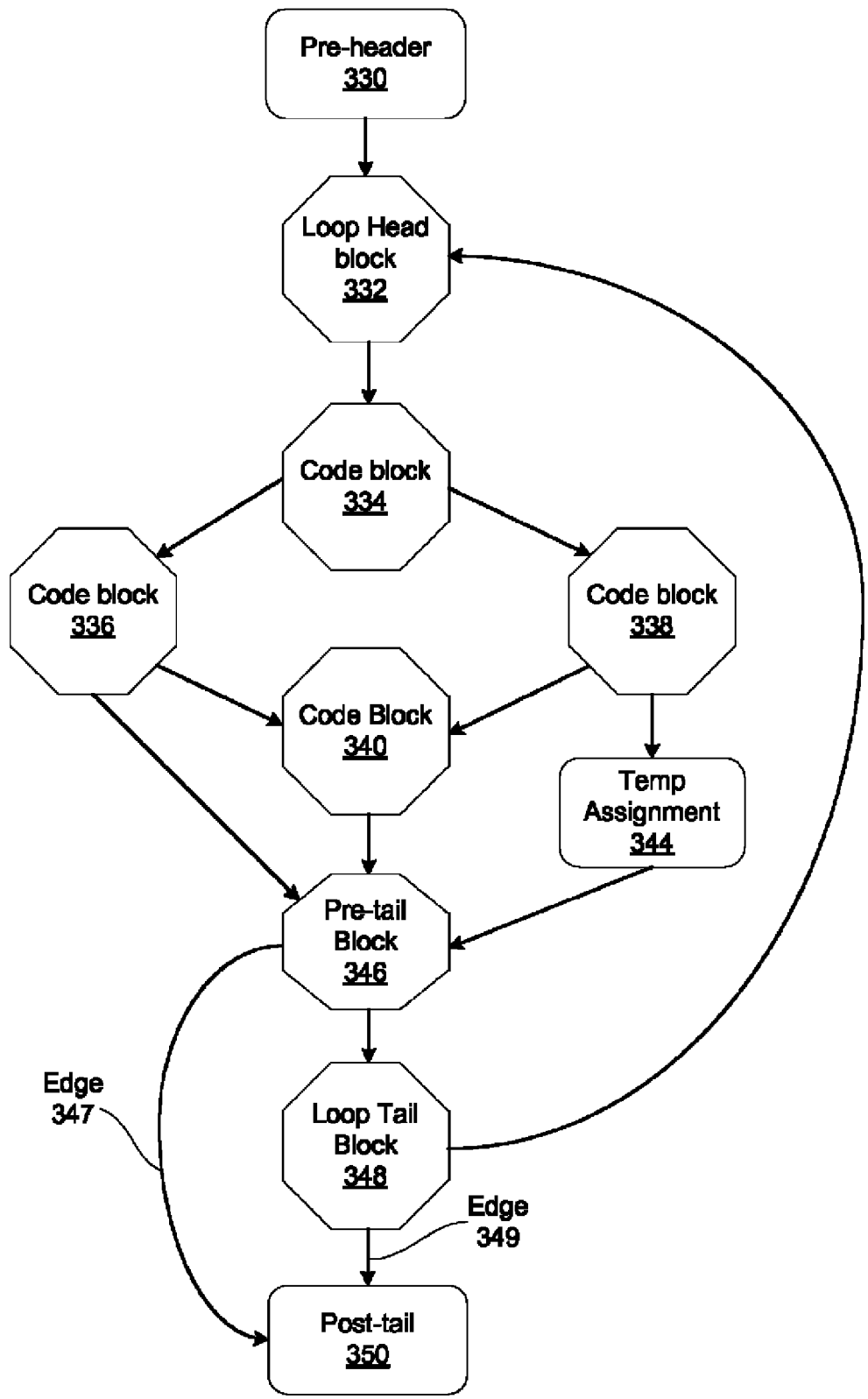
FIG. 3B is a control flow graph FIG. 3A after the insertion of synchronization points in accordance with one or more aspects of the present invention.

FIG. 3B is a control flow graph FIG. 3A after the insertion of synchronization points by the compiler, in accordance with one or more aspects of the present invention. The compiler creates a pre-tail block 346 and redirects all edges entering the tail block, loop tail block 348 into pre-tail block 346. Specifically, the compiler inserts a push break instruction into loop head block 332 that includes the address of pre-tail block 356. The compiler then connects pre-tail block 346 to loop tail block 348 using a conditional branch instruction. In order to synchronize the run away path resulting from loop exit edge 307 an additional node is inserted by the compiler, temp assignment 344. Temp assignment 344 intercepts loop exit edge 307 and redirects the output of code block 338 to pre-tail block 346. Any other edges (not shown) that enter post-tail 350 (except for edges that go from loop tail block 348 to loop head block 332 or to pre-header 330) are input to temp assignment 344. The compiler changes the branch condition instruction in blocks that are connected to an edge that is input to pre-tail block 346 with a break instruction.

The compiler creates a temporary variable, TEMP and inserts an assignment of TEMP to a value of 1 into temp assignment 344. The compiler inserts an initialization of TEMP to a value of 0 in pre-header 330. The conditional branch inserted by the compiler into pre-tail block 346 that "jumps over" tail code block 348 to post-tail 350 when TEMP is set to 1 via new edge 347. Threads that do not pass through temp assignment 344 will proceed from pre-tail block 346 to post-tail block 350 via edge 349. Generally, all continue and loop exits are collected at newly created pre-tail block 346 and the TEMP variable is used to differentiate between continue and exit paths. The "fall-through" exit path exits the loop to post-tail 350 via edge 349.

Figure 3C:
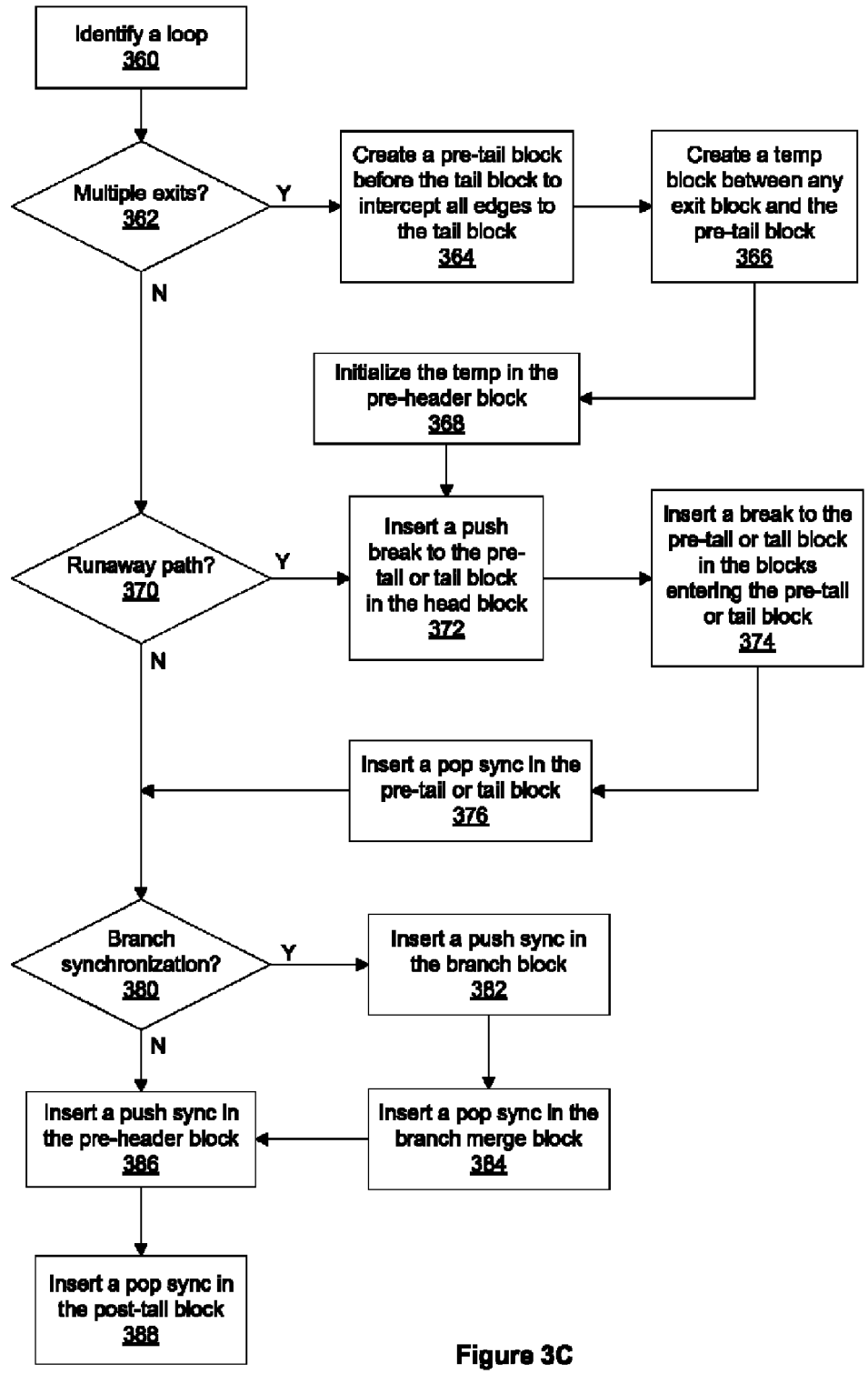
FIG. 3C is a flow diagram of method steps for inserting synchronization points in the control flow graph of FIG. 3A to produce the flow control graph of FIG. 3B in accordance with one or more aspects of the present invention.

FIG. 3C is a flow diagram of method steps for inserting synchronization points in the control flow graph of FIG. 3A to produce the flow control graph of FIG. 3B, in accordance with one or more aspects of the present invention. In step 360 the compiler identifies a loop in a control flow graph, such as the control flow graph shown in FIG. 3A. In step 362 the compiler determines if the loop has multiple exits, and, if so, in step 364 the compiler creates a pre-tail block before the loop tail block to intercept all edges to the loop tail block. In step 366 the compiler creates a temp block between any exit block, i.e., block that is connected to a loop exit edge other than the fall through exit, and the pre-tail block. In step 366 the compiler also inserts an assignment of a temporary variable to a value of 1 in the temp block. In step 368 the compiler initializes the temporary variable to a value of 0 in the pre-header block. If, in step 362 the compiler determines that the loop only has one exit, then the compiler proceeds directly to step 372.

In step 370 the compiler determines if the loop includes a run away path, and, if not then the compiler proceeds directly to step 380. Otherwise, in step 372 the compiler inserts a push break instruction that includes the address of the pre-tail block, or tail block if there was a single exit, into the loop head block. In step 374 the compiler replaces a branch instruction with a break instruction that includes the address of the pre-tail block (or tail block if there was a single exit) into original blocks with paths that enter the loop tail block. Note that the temp block created in step 366 will already include a break to the pre-tail block. In step 376 the compiler inserts a pop synchronization instruction into the pre-tail block, or tail block if there was a single exit, to create a synchronization point for threads taking the run away path.

In step 380 the compiler determines if a conditional branch is included within the loop, such as the code block 334 of FIGS. 2A and 2B. If, in step 360 the compiler determines that the loop does not include a conditional branch, then the compiler proceeds directly to step 386. Otherwise, in step 382 the compiler inserts a push synchronization instruction into the branch block. In step 384 the compiler inserts a pop synchronization instruction into the branch merge block, such as code block 340 of FIGS. 2A and 2B, to create a (partial) synchronization point for the conditional branch. In step 386 the compiler inserts a push synchronization instruction into the pre-header block. In step 388 the compiler inserts a pop synchronization instruction into the post-tail block to create a synchronization point for the loop.

FIG. 4 is a block diagram illustrating a computing system 400 and a compiler 411 configured to insert synchronization points into a computer program, in accordance with one or more aspects of the present invention. As shown, computer system 400 may include, without limitation, a host computer 410 and a graphics subsystem 470. Computing system 400 may be a desktop computer, server, laptop computer, palm-sized computer, tablet computer, game console, cellular telephone, computer based simulator or the like. Host computer 410 includes a host processor 414, which may include a system memory controller to interface directly to a host memory 412 or may communicate with host memory 412 through a system interface 415. System interface 415 may be an input/output (I/O) interface or a bridge device including the system memory controller to interface directly to host memory 412.

A compiler 411 is stored in host memory 412 and configured to insert synchronization points into a software program for execution by host processor 414 or graphics processor 405. Compiler 411 is executed by host processor 414 and may produce a source code file for execution at a later time on a target processor. In some embodiments of the present invention, compiler 411 may be executed in a runtime mode to produce program instructions, including inserted synchronization point for immediate execution.

A graphics device driver, driver 413, interfaces between a programmable graphics processor 405 and processes executed by host processor 414, such as compiler 411, source code files produced by compiler 411, application programs, and the like, translating program instructions as needed for execution by graphics processor 405. Driver 413 also uses commands to configure sub-units within graphics processor 405. Host computer 410 communicates with graphics subsystem 470 via system interface 415 and a graphics interface 417 within a graphics processor 405. Data received at graphics interface 417 can be passed to graphics processing pipeline 450 or written to a local memory 440 through memory controller 420. Graphics processing pipeline 450 may include a multithreaded processing array with one or more multithreaded processing units 460 and a corresponding execution stack 455 that for each one of the multithreaded processing units 460. Graphics processor 405 uses graphics memory to store graphics data and program instructions, where graphics data is any data that is input to or output from components within the graphics processor. Graphics memory can include portions of host memory 412, local memory 440, register files coupled to the components within graphics processor 405, and the like. In alternate embodiments, host processor 414, graphics processor 405, system interface 415, or any combination thereof, may be integrated into a single processing unit. Further, the functionality of graphics processor 405 may be included in a chip set or in some other type of special purpose processing unit or co-processor.

In a typical implementation, graphics processing pipeline 450 performs geometry computations, rasterization, and pixel computations. Therefore, graphics processing pipeline 450 is programmed to operate on surface, primitive, vertex, fragment, pixel, sample or any other data. For simplicity, the term "samples" is hereinafter used to refer to surfaces, primitives, vertices, pixels or fragments of the like. The samples are processed according to at least one program that includes graphics program instructions. A program can process one or more sets of samples. Conversely, a set of samples can be processed by a sequence of one or more programs.

When the data received by graphics subsystem 470 has been completely processed by graphics processor 405, an output 485 of graphics subsystem 470 is provided using an output controller 480. Output controller 480 is optionally configured to deliver data to a display device, network, electronic control system, other computing system 400, other graphics subsystem 470, or the like. Alternatively, data is output to a film recording device or written to a peripheral device, e.g., disk drive, tape, compact disk, or the like.

Graphics processor 405 receives commands from host computer 410 via graphics interface 417. Some of the commands are used by graphics processing pipeline 450 to initiate processing of data by providing the location of program instructions or graphics data stored in memory. Graphics processing pipeline 450 includes two or more programmable processing units that may be configured to perform a variety of specialized functions. Some of these functions are table lookup, scalar and vector addition, multiplication, division, coordinate-system mapping, calculation of vector normals, tessellation, calculation of derivatives, interpolation, and the like. In particular, a programmable processing unit may be configured to perform raster operations, including near and far plane clipping and raster operations, such as stencil, z test, and the like. Data processing operations are performed in multiple passes through those units or in multiple passes through one or more multithreaded processing units 460 in graphics processing pipeline 450. During the processing, data may be stored in graphics memory and read at a later time for further processing.

Graphics processing pipeline 450 includes interfaces to memory controller 220 through which data can be read from memory and written to memory, e.g., any combination of local memory 240 and host memory 212. In some embodiments of the present invention, graphics processing pipeline 450 is a multithreaded processing array. Memory controller 420 arbitrates requests received from various clients within graphics processing pipeline 450 that correspond to the interfaces, e.g., programmable processing units, to distribute the memory bandwidth between the various clients.

A multithreaded processing unit 460 within graphics processing pipeline 450 can receive first samples, such as higher-order surface data, and tessellate the first samples to generate second samples, such as vertices. The multithreaded processing unit 460 can be configured to transform the second samples from an object-based coordinate representation (object space) to an alternatively based coordinate system such as world space or normalized device coordinates (NDC) space. The samples, such as vertices, are then rasterized to produce other samples, such as fragments that may be texture mapped, shaded, blended and the like.

Each multithreaded processing unit 460 includes an execution stack 455 that is a storage mechanism that operates in a last-in, first-out fashion and comprises a logical collection of hardware-managed tokens. One independent stack is associated with one thread group. As will become apparent in the descriptions of FIG. 5, execution stack 455 is populated with tokens (i.e., tokens are pushed onto execution stack 455) and unwound (i.e., tokens are popped from execution stack 455) in a way that precludes any token from being overwritten, regardless of the number of divergences that occur or the number of nesting levels that exist in the program. Further, the operation of the stack in combination with the information included in the different types of tokens provide an efficient mechanism for executing the various instructions in a program having several branches and for synchronizing threads as they navigate the different branches of that program.

The actual number of divergences and nesting levels that can be supported is, of course, limited by the size of execution stack 455 that is used to store the divergence and flow control information as well as the SIMD width of the particular thread group. Regardless of the size of execution stack 455, however, the system and method are robust. For example, driver 413 or compiler 411 may be configured to ensure that the stack depth is not exceeded for a particular program, thereby avoiding problems related to memory stack size limitations.

In one embodiment, graphics processing pipeline 450 may be configured to simultaneously process twenty-four independent thread groups. In one embodiment, each thread group may include up to thirty-two threads. A particular multithreaded processing unit 460 within graphics processing pipeline 450 may process one or more such thread groups. The multithreaded processing unit 460 is configured to maintain an active mask and an active program counter for each of the thread groups it processes. The active mask is a string of bits that indicates which threads in the thread group are currently active (i.e., currently executing instructions). Each bit in the active mask corresponds to one thread in the thread group. In one embodiment, a bit is set if its corresponding thread is active. Thus, when all bits in the active mask are set, the multithreaded processing unit 460 is operating in fully synchronized mode. The active program counter indicates the address of the instruction in the program currently being executed by the active threads. The method described in conjunction with FIGS. 1E, 2A, 2B, and 3C may be used to synchronize and partially synchronize the active threads in the thread group.

As the multithreaded processing unit 460 processes instructions in the program, it may encounter one or more pop synchronization instructions, push synchronization instructions, and branch instructions. As described in further detail in conjunction with FIG. 5, when a certain instructions are encountered, the multithreaded processing unit 460 pushes a token onto or pops a token from execution stack 455. Each such token includes state information related to various threads in the thread group. The specific state information included in a token depends on the type of instruction encountered. After pushing the token onto the stack, the multithreaded processing unit 460 may disable certain threads in the thread group, while keeping the other threads active. The active threads then execute the instructions associated with a branch. Again, the type of branch instruction encountered determines which threads, if any, in the thread group are disabled and which threads remain active.

FIG. 5 is a flow diagram of method steps for executing the push synchronization and pop synchronization instructions, in accordance with one or more aspects of the present invention. In particular this figure describes how the multithreaded processing unit 460 pushes and pops different tokens onto and from execution stack 455 as the different program instructions, including push and pop synchronization instructions, are processed to ensure that the different program instructions are executed by the appropriate threads.

In step 500 multithreaded processing unit 460 receives the program instruction corresponding to the current setting of the active program counter. In step 505, multithreaded processing unit 460 determines whether the instruction is a push synchronization instruction, and if so, in step 510 multithreaded processing unit 460 pushes a synchronization token onto execution stack 455. A synchronization token is used to synchronize threads that were active when a branch instruction was originally encountered once those threads have completed executing that branch. The synchronization token therefore includes an active mask indicating the threads that were active when the push synchronization instruction was executed.

Effectively, the synchronization token allows the multithreaded processing unit 460 to gather threads that may have diverged while executing a portion of the program associated with the synchronization bit until all of the threads that were active when the push synchronization instruction was executed have been reassembled. In the case of partial synchronization, only the non-run away active threads will be synchronized when the diverged threads are gathered. When the assembled threads reflect the active mask in the synchronization token, the threads in the thread group that were active when the push synchronization instruction was executed are synchronized. After the synchronization token is pushed onto the stack the active program counter is incremented and the method proceeds to step 560, to read the next instruction in the program.

If, in step 505, multithreaded processing unit 460 determines that the instruction is not a push synchronization instruction, in step 515 multithreaded processing unit 460 determines if the instruction is a push break instruction. If the instruction is not a push break instruction, then the method proceeds directly to step 525. Otherwise, in step 520 multithreaded processing unit 460 pushes a synchronization token onto execution stack 455 and pushes a break token onto execution stack 455. The break token includes an address specified by the push break instruction, e.g., an after-loop program counter that is used when a break instruction is executed and the break token is popped from execution stack 455. Specifically, the break token includes an active mask and an "after-loop" program counter. Similar to call instructions, push break instructions are not conditional. Therefore, the active mask included in the break token not only indicates the threads that are active when the push break instruction is encountered, but also the threads that execute the push break branch. The after-loop program counter reflects the address of the instruction that the threads execute after executing the instructions associated with the push break branch. In step 520 the active program counter is incremented and the method proceeds to step 560, to read the next instruction in the program.

In step 525 multithreaded processing unit 460 determines if the instruction is a pop synchronization instruction, and, if not, the method proceeds directly to step 545. Otherwise, in step 530 multithreaded processing unit 460 determines if a synchronization token is at the top of execution stack 455, and, if so, in step 535 the synchronization token is popped. A pop synchronization instruction indicates that the threads that have diverged since the last synchronization token was pushed onto the stack are to be executed to the address of the pop synchronization instruction. As described in further detail herein, this process reestablishes the level of thread synchronization that existed when this last synchronization token was pushed onto the stack. In other words, the process reestablishes the level of thread synchronization that existed when the last push synchronization instruction was executed.

If a synchronization token is not at the top of execution stack 455, then in step 540 multithreaded processing unit 460 pops the synchronization token and updates the active mask with the mask that is included in the synchronization token. The mask included in a synchronization token is the active mask that existed when the push synchronization instruction corresponding to the synchronization token was executed. Thus, setting the active mask equal to the mask included in the synchronization token, activates all of the threads that were active when that push synchronization instruction was originally encountered. By activating these threads, the same level of thread synchronization that existed when the push synchronization instruction was originally encountered is reestablished.

If, in step 530, the multithreaded processing unit 460 determines that the token on top of execution stack 455 is not a synchronization token, then the method proceeds to step 540. In step 540, multithreaded processing unit 460 pops the token on the top of the stack and sets the active mask to the mask included in the token and sets the active program counter to the program counter included in the token. In this step, the token popped from the stack will be a divergence token. The mask included in a divergence token is the not-taken mask, and the program counter included in the divergence token is the not-taken program counter. In one embodiment of the present invention, setting the active mask to the not-taken mask has the effect of activating the threads that need to execute the if-side of the conditional branch associated with the divergence token, while disabling the threads that just completed executing the else-side of that branch. Setting the active program counter to the not-taken program counter stipulates that the newly activated threads execute the first instruction on the if-side of the conditional branch. This process enables the execution of the if-side of the conditional branch. After step 535 or 540, the method proceeds to step 560, where multithreaded processing unit 460 fetches the program instruction corresponding to the updated setting of the active program counter.

In step 545 multithreaded processing unit 460 determines if the instruction is a break instruction or a return instruction, and, if not, the method proceeds directly to step 550. If, in step 545, the multithreaded processing unit 460 determines that the instruction is a return or break instruction, then the end of a subroutine associated with a call/return branch or the end of a loop of instructions associated with a push branch instruction has been reached, and the method proceeds to step 540. In step 540, the multithreaded processing unit 460 pops the token on the top of execution stack 455 and sets the active mask equal to the mask included in the popped token and sets the active program counter to the program counter included in the popped token. Then, the method proceeds to step 560 to read the next instruction.

If the instruction is a return instruction, then the popped token may be a call token or a token pushed during the execution of a push break instruction or conditional branch construct. The mask included in a call token is the active mask that existed when the call/return branch was encountered, and the program counter in a call token is the return program counter. Since no threads diverge when a call/return branch is encountered, setting the active mask equal to the mask in the call token has the effect of keeping active the threads that executed the subroutine associated with the call/return branch. Setting the active program counter equal to the return program counter stipulates that the active threads return to the instruction in the program subsequent to the call instruction (i.e., the fall-through instruction).

If the instruction is a break instruction, then the popped token will be a break token. The mask included in a break token is the active mask that existed when the push break instruction was executed, and the program counter in the break token is the after-loop program counter. Again, since no threads diverge when a push break instruction is executed, setting the active mask equal to the mask in the break token has the effect of keeping active the threads that executed the loop of instructions associated with the push break instruction, i.e., instructions in the run away path. Setting the active program counter to the after-loop program counter stipulates that the active threads branch to the instruction having the address designated by the after-loop program counter.

In step 550 multithreaded processing unit 460 executes the instruction. If the instruction is a call instruction, a call token is pushed onto execution stack 455 that includes state information about the threads that execute the call/return branch as well as return address information. Specifically, the call token includes an active mask and a "return" program counter. The active mask indicates which threads are active when the call instruction is encountered. Because call instructions are not conditional, there are no thread divergences associated with a call/return branch. Thus, the active mask included in the call token also indicates which threads execute the call/return branch. The return program counter provides a return address for the threads that execute the call/return branch and reflects the address of the instruction in the program subsequent to the call instruction (i.e., the fall-through instruction).

After pushing the call token onto the stack, multithreaded processing unit 460 sets the active program counter to the "taken" program counter. The taken program counter indicates the address of the first instruction of the subroutine associated with the call/return branch. Thus, setting the active program counter to the taken program counter stipulates that the active threads (i.e., all of the threads that are active when the call instruction is encountered) execute this first instruction. Execution of other types of instructions in step 550 may or may not push or pop any entries to/from execution stack 455.

In step 555 multithreaded processing unit 460 determines if the program instruction causes at least one active thread to diverge from the other active threads, and, if not, processing of the instruction is completed in step 560. One or more threads may diverge when a conditional branch instruction is executed. If some but not all of the active threads take the branch, then a thread divergence occurs, and the method proceeds to step 565.

In step 565, multithreaded processing unit 460 pushes a divergence token onto the stack. The divergence token includes state information about the threads that do not take the branch (i.e., the threads for which the inverted condition is not satisfied). Specifically, the divergence token includes a "not-taken" mask and a "not-taken" program counter. The not-taken mask indicates which threads in the original group of active threads do not branch to the instructions associated with the else-side of the conditional branch. The not-taken program counter indicates the address of the first instruction associated with the if-side of the conditional branch (also referred to as the "fall-through" instruction).

After the divergence token is pushed onto the stack, in step 565, multithreaded processing unit 460 sets the active mask to the "taken" mask and the active program counter to the "taken" program counter. The taken mask indicates which threads in the original group of active threads execute the instructions associated with the else-side of the conditional branch. Setting the active mask to the taken mask in step 565 has the effect of activating the threads that execute the else-side of the conditional branch, while disabling the threads that execute the if-side of the conditional branch. The taken program counter indicates the address of the first instruction associated with the else-side of the conditional branch. Thus, setting the active program counter to the taken program counter stipulates that the active threads (i.e., the threads executing the else-side of the conditional branch) execute this first instruction.

One advantage of the disclosed system and method is that they enable threads in a multithreaded architecture to be broken into several thread groups, where the number of threads in each group is based on the size of the active mask. When a branch in a program is encountered, each thread group is able to traverse the branch independently of the other thread groups in a MIMD manner. Thus, the thread groups that do not execute a branch do not have to be disabled while the branch is being executed. Further, the disclosed system and method provide an efficient mechanism for managing thread divergences within a particular thread group when that thread group executes one or more branches in a program. The result is a system that operates in full SIMD mode when possible and suffers only minimal performance degradation when thread divergences occur within a particular thread group as a branch is executed.

In order to synchronize divergent threads in the thread group a compiler inserts synchronization points into the program. The synchronization points are needed to maintain processing efficiencies and compatibility with graphics APIs that require SIMD processing. Persons skilled in the art will appreciate that any system configured to perform the method steps of FIGS. 1E, 2A, 2B, 3C, and 5, or their equivalents, are within the scope of the present invention.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for inserting synchronization points in a software program, comprising:
identifying a post-dominate first node of a control flow graph that represents the software program, wherein every path from a second node of the control flow graph passes through the post-dominate first node, wherein the post-dominate first node is a post-tail node of a loop and the second node is a pre-header node of the loop;
inserting a push synchronization instruction into the second node to push a synchronization token onto a stack during execution of the software program;
inserting a pop synchronization instruction into the post-dominate first node to create a first synchronization point in the software program where divergent execution threads in a thread group wait for one or more clock cycles, wherein the pop synchronization instruction causes the synchronization token to be popped from the stack during execution of the software program after all execution threads in the thread group have reached the post-dominate first node and are synchronized;
inserting a push synchronization instruction into a third node within the loop that includes a conditional branch;
inserting a pop synchronization instruction into a fourth node within the loop that merges the conditional branch to create a second synchronization point for the conditional branch;
identifying a run away path that does not pass through the second synchronization point and connects a fifth node to a sixth node that are each within the loop;
inserting a push break instruction that specifies an address of the sixth node into a seventh node that is a loop head of the loop;
replacing a branch that corresponds to an edge into the sixth node with a break to the sixth node; and
inserting a pop synchronization instruction in the sixth node to create a third synchronization point in the software program that synchronizes any threads taking the run away path with other threads in the thread group.

2. A method for inserting synchronization points in a software program, comprising:
identifying a first node of a control flow graph that represents the software program, wherein the first node is a post-tail node of a loop that post-dominates a second node that is a dominate node of the control flow graph and a pre-header node of the loop;
inserting a push synchronization instruction into the second node to push a synchronization token onto a stack during execution of the software program;
inserting a pop synchronization instruction into the first node to create a first synchronization point in the software program that causes the synchronization token to be popped from the stack during execution of the software program when execution threads in a thread group are synchronized;
creating a second synchronization point within the loop;
identifying an additional exit path from a third node that jumps out of the loop and does not pass through the second synchronization point;
creating a pre-tail node that provides a path to a loop tail node of the loop and intercepts all paths input to the loop tail node;
creating a temp node between the third node and the pre-tail node to intercept the additional exit path;
assigning a temporary variable to a first value in the temp node;
initializing the temporary variable to a second value in the second node; and
inserting a conditional branch in the pre-tail block that is based on the temporary variable to provide a path to the first node.

3. The method of claim 2, further comprising:
inserting a push break instruction that specifies an address of the pre-tail node into the second node;
replacing a branch in each node that enters the pre-tail node with a break to the pre-tail node; and
inserting a pop synchronization instruction in the pre-tail node to create a second synchronization point in the software program that synchronizes any threads taking the additional exit path with other threads in the thread group.

4. A method for inserting synchronization points in a software program, comprising:
identifying a post-dominate first node of a control flow graph that represents the software program, wherein every path from a second node of the control flow graph passes through the post-dominate first node;
inserting a push synchronization instruction into the second node to push a synchronization token onto a stack during execution of the software program;
inserting a pop synchronization instruction into the post-dominate first node to create a first synchronization point in the software program where divergent execution threads in a thread group wait for one or more clock cycles, wherein the pop synchronization instruction causes the synchronization token to be popped from the stack during execution of the software program after all execution threads in the thread group have reached the post-dominate first node and are synchronized;
identifying a run away path that does not pass through the first synchronization point and connects a third node to a fourth node that are each dominated by the second node;
inserting a push break instruction that specifies an address of the fourth node into a fifth node that is a pre-header of the second node;
replacing a branch that corresponds to an edge into the fourth node with a break to the fourth node; and
inserting a pop synchronization instruction in the fourth node to create a second synchronization point in the software program that synchronizes any threads taking the run away path with other threads in the thread group.

5. A non-transitory computer readable medium storing instructions for causing a processor to insert synchronization points in a software program by performing the steps of:
identifying a post-dominate first node of a control flow graph that represents the software program, wherein every path from a second node of the control flow graph passes through the post-dominate first node, wherein the post-dominate first node is a post-tail node of a loop and the second node is a pre-header node of the loop;
inserting a push synchronization instruction into the second node to push a synchronization token onto a stack during execution of the software program;

inserting a pop synchronization instruction into the post-dominate first node to create a first synchronization point in the software program where divergent execution threads in a thread group wait for one or more clock cycles, wherein the pop synchronization instruction causes the synchronization token to be popped from the stack during execution of the software program after all execution threads in the thread group have reached the post-dominate first node and are synchronized;

inserting a push synchronization instruction into a third node within the loop that includes a conditional branch;

inserting a pop synchronization instruction into a fourth node within the loop that merges the conditional branch to create a second synchronization point for the conditional branch;

identifying a run away path that does not pass through the second synchronization point and connects a fifth node to a sixth node that are each within the loop;

inserting a push break instruction that specifies an address of the sixth node into a seventh node that is a loop head of the loop;

replacing a branch that corresponds to an edge into the sixth node with a break to the sixth node; and inserting a pop synchronization instruction in the sixth node to create a third synchronization point in the software program that synchronizes any threads taking the run away path with other threads in the thread group.

6. A non-transitory computer readable medium storing instructions for causing a processor to insert synchronization points in a software program by performing the steps of:

identifying a first node of a control flow graph that represents the software program, wherein the first node is a post-tail node of a loop that post-dominates a second node that is a dominate node of the control flow graph and a pre-header node of the loop;

inserting a push synchronization instruction into the second node to push a synchronization token onto a stack during execution of the software program;

inserting a pop synchronization instruction into the first node to create a first synchronization point in the software program that causes the synchronization token to be popped from the stack during execution of the software program when execution threads in a thread group are synchronized;

creating a second synchronization point within the loop;

identifying an additional exit path from a third node that jumps out of the loop and does not pass through the second synchronization point;

creating a pre-tail node that provides a path to a loop tail node of the loop and intercepts all paths input to the loop tail node;

creating a temp node between the third node and the pre-tail node to intercept the additional exit path;

assigning a temporary variable to a first value in the temp node;

initializing the temporary variable to a second value in the second node; and inserting a conditional branch in the pre-tail block that is based on the temporary variable to provide a path to the first node.

7. The non-transitory computer readable medium of claim 6, further comprising:

inserting a push break instruction that specifies an address of the pre-tail node into the second node;

replacing a branch in each node that enters the pre-tail node with a break to the pre-tail node; and inserting a pop synchronization instruction in the pre-tail node to create a second synchronization point in the software program that synchronizes any threads taking the additional exit path with other threads in the thread group.

8. A non-transitory computer readable medium storing instructions for causing a processor to insert synchronization points in a software program by performing the steps of:

identifying a post-dominate first node of a control flow graph that represents the software program, wherein every path from a second node of the control flow graph passes through the post-dominate first node;

inserting a push synchronization instruction into the second node to push a synchronization token onto a stack during execution of the software program;

inserting a pop synchronization instruction into the post-dominate first node to create a first synchronization point in the software program where divergent execution threads in a thread group wait for one or more clock cycles, wherein the pop synchronization instruction causes the synchronization token to be popped from the stack during execution of the software program after all execution threads in the thread group have reached the post-dominate first node and are synchronized;

identifying a run away path that does not pass through the first synchronization point and connects a third node to a fourth node that are each dominated by the second node;

inserting a push break instruction that specifies an address of the fourth node into a fifth node that is a pre-header of the second node;

replacing a branch that corresponds to an edge into the fourth node with a break to the fourth node; and inserting a pop synchronization instruction in the fourth node to create a second synchronization point in the software program that synchronizes any threads taking the run away path with other threads in the thread group.

9. A computing system for inserting synchronization points in a software program, comprising:

a compiler program configured to:

identify a first node of a control flow graph that represents the software program, wherein the first node is a post-tail node of a loop that post-dominates a second node that is a dominate node of the control flow graph and a pre-header node of the loop;

insert a push synchronization instruction into the second node to push a synchronization token onto a stack during execution of the software program;

insert a pop synchronization instruction into the first node to create a first synchronization point in the software program that causes the synchronization token to be popped from the stack during execution of the software program when execution threads in a thread group are synchronized;

identify an additional exit path from a third node that jumps out of the loop and does not pass through the second synchronization point;

create a pre-tail node that provides a path to a loop tail node of the loop and intercepts all paths input to the loop tail node;

create a temp node between the third node and the pre-tail node to intercept the additional exit path;

assign a temporary variable to a first value in the temp node;

initialize the temporary variable to a second value in the second node; and insert a conditional branch in the pre-tail block that is based on the temporary variable to provide a path to the first node that bypasses the loop tail block; and
a memory configured to store the compiler program and the software program; and
a processor coupled to the memory and configured to execute the compiler program.

10. The computing system of claim 9, wherein the compiler program is further configured to create a third synchronization point in the pre-tail node of the software program that synchronizes any threads taking the additional exit path with other threads in the thread group.

* * * * *